United States Patent

Murao et al.

Patent Number: 5,827,599
Date of Patent: Oct. 27, 1998

[54] MAGNETIC RECORDING TAPE HAVING A BACKCOAT AND SPECIFIED EDGE PROFILE

[75] Inventors: Naoto Murao; Masatoshi Takahashi; Nobuyoshi Asada; Jun-ichi Nakamigawa; Nobuyuki Kobayashi, all of Kanagawa, Japan

[73] Assignee: Fuji Photo Film Co., Ltd., Japan

[21] Appl. No.: 745,601

[22] Filed: Nov. 8, 1996

[30] Foreign Application Priority Data

Nov. 30, 1995 [JP] Japan .................................. 7-312606

[51] Int. Cl.$^6$ ....................................................... G11B 5/68
[52] U.S. Cl. ........................... 428/141; 428/216; 428/328; 428/330; 428/331; 428/473.5; 428/474.4; 428/480; 428/694 BB; 428/192; 428/900
[58] Field of Search ..................... 428/141, 216, 428/328, 330, 331, 473.5, 474.4, 480, 694 BB, 900, 192

[56] References Cited

U.S. PATENT DOCUMENTS

| | | |
|---|---|---|
| 4,451,531 | 5/1984 | Isobe et al. .............................. 428/329 |
| 4,684,572 | 8/1987 | Yasufuku et al. ........................ 428/323 |
| 5,164,243 | 11/1992 | Kanazawa et al. ..................... 428/192 |
| 5,419,961 | 5/1995 | Kobayashi et al. ..................... 428/336 |

FOREIGN PATENT DOCUMENTS

Sho 64-78426  3/1989  Japan .

Primary Examiner—Stevan A. Resan
Attorney, Agent, or Firm—Brinks Hofer Gilson & Lione

[57] ABSTRACT

In the present invention, the anti-scrapability of the back layer of a magnetic recording medium is improved to reduce the frequency of occurrence of powder fall onto the surface of the magnetic layer and clogging between the magnetic head and the surface of the magnetic layer. As a result, a magnetic recording medium which is extremely less susceptible to dropout can be provided. A novel tape-shaped magnetic recording medium is provided which is obtained by longitudinally slitting a nonmagnetic support having on one side thereof a magnetic layer comprising a ferromagnetic powder dispersed in a binder and on the other side a back layer, wherein the edge face of said back layer doesn't protrude from the vertical line tangent to the highest protrusion on the slit section of said nonmagnetic support.

11 Claims, 2 Drawing Sheets

MAGNETIC RECORDING TAPE HAVING A BACKCOAT AND SPECIFIED EDGE PROFILE

FIELD OF THE INVENTION

The present invention relates to a magnetic recording medium, particularly to a tape-shaped magnetic recording medium obtained by longitudinally slitting a nonmagnetic support having a magnetic layer coated thereon. More particularly, the present invention relates to a magnetic recording medium for VTR comprising a nonmagnetic support having a high Young's modulus in the width direction which can record and reproduce a digital signal at a high density.

BACKGROUND OF THE INVENTION

In general, as a magnetic recording medium there is used one having on a nonmagnetic support a magnetic layer comprising a ferromagnetic powder dispersed in a binder.

In particular, a tape-shaped magnetic recording medium is produced by a process which comprises mixing and dispersing a ferromagnetic powder with a binder, additives and an organic solvent to prepare a magnetic coating solution, applying the magnetic coating solution to a nonmagnetic support, drying the coated (magnetic coating) solution to prepare a wide magnetic recording medium (web), and then cutting the web by a slitter into strips having a desired width such as 8 mm, ½ in. and 1 in.

In order to cut the magnetic recording medium web, a system as shown in FIG. 2 is employed. In FIG. 2, a magnetic recording medium web 13 is cut into strips having a desired width by means of a slitter 12 having a plurality of upper blades 14 and lower blades 15 arranged opposed to each other. The tape-shaped magnetic recording media 1 thus obtained are then wound on a pancake 17 via a guide roller 16.

As a magnetic recording medium there is also known one having a back layer on a surface of a nonmagnetic support opposite to the side of the magnetic layer. FIG. 1 is a typical enlarged view of a section of such the magnetic recording medium obtained by the foregoing cutting process. A magnetic recording medium 1 comprises a magnetic layer 2 provided on one side of a nonmagnetic support 4 and a back layer 3 provided on the other. On the section of the magnetic recording medium, the edge face 5 of the back layer protrudes beyond from the level of the top 6 of the highest protrusion on the nonmagnetic support 4.

In recent years, as the digitization becomes more popular, the recordable amount of data is drastically increased. To this end, the recording capacity per unit volume is enhanced by using a magnetic powder having a long axis length as a magnetic layer, reducing the number of surface protrusions to reduce the spacing loss and further reducing the thickness of the magnetic recording medium itself. In order to reduce the number of surface protrusions on the magnetic layer, the number of protrusions on the back layer is reduced. In order to prevent the deterioration of the running durability due to smoothening, the Young's modulus of the back layer is improved. Further, in order to prevent defective head contact, edge break or other troubles caused by the reduction of the thickness of the magnetic recording medium, a nonmagnetic support having a high Young's modulus in the width direction is used.

A tape magnetic recording medium comprising a nonmagnetic support having a high Young's modulus in the width direction and having a smooth back layer having a high Young's modulus provided thereon is particularly remarkable in the configuration of the slit section, i.e., protrusion on the edge face of the back layer as mentioned above.

However, a magnetic recording medium having a configuration of the slit section as mentioned above has some problems. In other words, the protrusion on the edge face of the back layer is scratched by flanged guide rollers in VTR during repeated use. The scratched powder falls onto the surface of the magnetic layer and clogs between the magnetic head and the surface of the magnetic layer. As a result, dropouts and other troubles frequently appear.

SUMMARY OF THE INVENTION

An object of the present invention is to provide a magnetic recording medium which is extremely less susceptible to dropout or the like by improving anti-scratching property of the back layer and hence reducing the frequency of the occurrence of powder fall onto the surface of the magnetic layer and clogging between the magnetic head and the surface of the magnetic layer.

The foregoing object of the present invention will become more apparent from the following detailed description and examples.

The inventors found that the more behind the level of the highest protrusion on the nonmagnetic support the edge face of the back layer is, the less is scratched the back layer by flanged guide rollers in VTR. The present invention has thus been achieved on the basis of this knowledge.

The present invention concerns a tape-shaped magnetic recording medium obtained by longitudinally slitting a nonmagnetic support having on one side thereof a magnetic layer comprising a ferromagnetic powder dispersed in a binder and on the other side a back layer, wherein the edge face of said back layer doesn't protrude from the vertical line tangent to the highest protrusion on the slit section of said nonmagnetic support.

BRIEF DESCRIPTION OF THE DRAWINGS

By way of example and to make the description more clear, reference is made to the accompanying drawings in which.

DETAILED DESCRIPTION OF THE INVENTION

Figure 1:
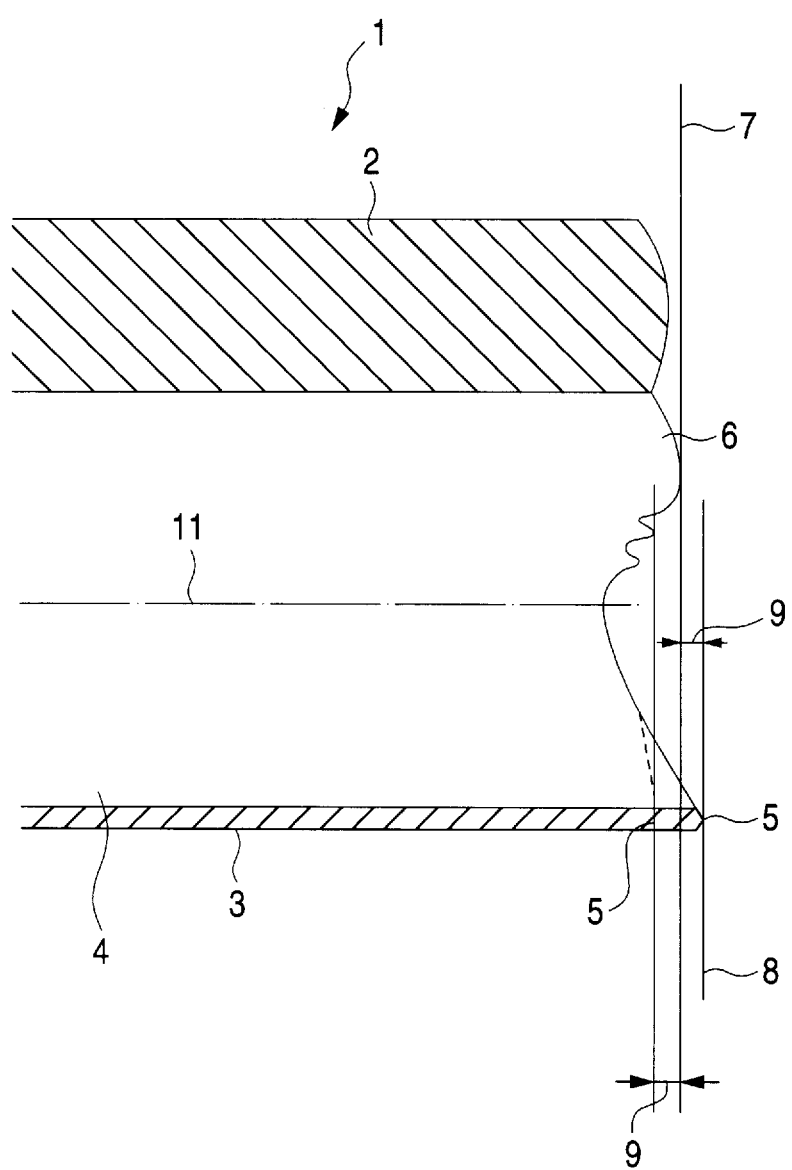
FIG. 1 is a typical enlarged view of a section of a magnetic recording medium.

The present invention will be further described in connection with FIG. 1.

The feature of the present invention that the edge face 5 of the back layer doesn't protrude from a reference line 7 which is the vertical line tangent to the highest protrusion 6 on the nonmagnetic support 4 as shown by the broken line. In other words, the conventional edge face 5 of the back layer shown by the solid line protrudes from the reference line 7. In the present invention, however, the edge face 5 of the back layer exists on the left side of the reference line 7 or on the reference line 7 as viewed in the drawing. In the present invention, the distance between the parallel line 8 tangent to the edge face 5 and parallel to the reference line 7 and the reference line 7 is defined as the amount of protrusion 9. If the parallel line 8 is kept off the top of the highest protrusion 6 and doesn't cross the top of the highest protrusion 6 as in the prior art, the amount of protrusion 9 is defined as plus. On the contrary, if the parallel line 8 crosses the top of the highest protrusion 6, the amount of protrusion 9 is defined as minus.

In the present invention, the amount of protrusion 9 is controlled to from minus to zero, normally from $-0.6$ $\mu$m to $0$ $\mu$m, preferably $-0.6$ $\mu$m to $-0.1$ $\mu$m, more preferably from $-0.4$ $\mu$m to $-0.2$ $\mu$m.

If the amount of protrusion is plus, the edge face of the back layer is drastically scratched when it comes into flanged guide rollers in VTR, causing more powder drop from the back layer. The powder contaminates the running path of the magnetic recording medium and the surface of the magnetic layer or clogs between the magnetic layer and the magnetic head. This contamination or clogging causes dropouts as mentioned above. The above definition of the amount of protrusion as in the present invention can efficiently prevent this contamination or clogging.

In the present invention, the foregoing requirements for the amount of protrusion can be satisfied by defining the Young's modulus in the width direction of the back layer to not less than 600 Kg/mm$^2$. Thus, the surface properties of the back layer can be fairly maintained, providing a high output. In the prior art, on the other hand, when the Young's modulus in the width direction of the back layer falls within the above defined range, a sufficient running durability cannot be obtained as previously mentioned.

The Young's modulus in the width direction of the back layer of the present invention is preferably controlled to a range of from 600 to 1,100 Kg/mm$^2$, more preferably from 800 to 1,100 Kg/mm$^2$.

If the Young's modulus in the width direction of the back layer falls less than 600 Kg/mm$^2$, there arises a drastically increased frictional resistance due to repeated running, causing the deterioration in the repeated running properties or more powder fall from the back layer when it comes into contact with flanged rollers. This results in dropouts, etc.

In the present invention, the use of a nonmagnetic support having a Young's modulus in the width direction of not less than 850 Kg/mm$^2$, preferably from 900 to 1,300 Kg/mm$^2$, more preferably from 1,100 to 1,300 Kg/mm$^2$ can improve the head contact and prevent the edge break.

In the present invention, by controlling Ra (i.e., center line surface roughness) of the back layer to a range of from not less than 3.0 nm to less than 8.0 nm, preferably from not less than 3.0 $\mu$m to less than 6.0 $\mu$m, more preferably from not less than 4.0 $\mu$m to less than 5.0, the transfer of the components in the back layer to the magnetic layer can be prevented, inhibiting the output drop (i.e., decrease of the output) due to spacing loss. If Ra is 8.0 nm or more, the output is lowered. On the contrary, if Ra is less than 3.0 nm, there is no influence due to the components of the back layer to be transferred to the magnetic layer but the frictional resistance is increased to deteriorate the running properties.

Figure 2:
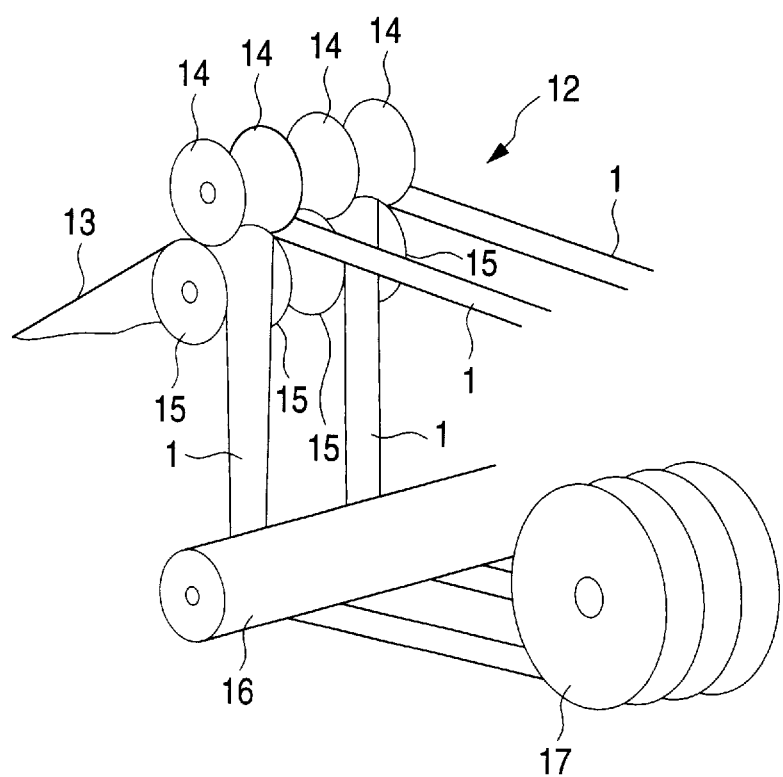
FIG. 2 is a diagram illustrating a slitter for cutting a magnetic recording medium, wherein the reference numeral 1 indicates a magnetic recording medium, the reference numeral 2 indicates a magnetic layer, the reference numeral 3 indicates a back layer, the reference numeral 4 indicates a nonmagnetic support, the reference numeral 5 indicates an edge face of a back layer, the reference numeral 6 indicates the top of the highest protrusion, the reference numeral 7 indicates a reference line, the reference numeral 8 indicates a parallel line, the reference numeral 9 indicates the amount of protrusion, the reference numeral 10 indicates a protrusion, the reference numeral 11 indicates central line, the reference numeral 12 indicates a slitter, the reference numeral 13 indicates a magnetic recording medium web, the reference numeral 14 indicates an upper blade, the reference numeral 15 indicates a lower blade, the reference numeral 16 indicates a guide roller, and the reference numeral 17 indicates a pancake.

The method for attaining the specified amount of protrusion from the back layer and the specified Young's modulus of the back layer to be used in the present invention is not specifically limited. For example, the slitting rate, the depth of engaging, the ratio of circumferential speed of upper blade (male blade) to that of lower blade (female blade), and the continuous working time of the slitting blade may be selected in the slitting by a slitter as shown in FIG. 2. Alternatively, the composition of the back layer, e.g., binder described later, or the kind and amount of various additives to be optionally added, such as nonmagnetic powder, lubricant and dispersant, particularly binder, may be selected.

The slitting rate is preferably higher. In some details, the optimum slitting rate is from 200 to 800 m/min, preferably from 300 to 600 m/min, more preferably from 400 to 500 m/min.

The depth of engaging is preferably greater. In some details, the optimum depth of engaging is from 0.1 to 0.8 mm, preferably from 0.25 to 0.7 mm, more preferably from 0.4 to 0.5 mm.

The optimum ratio of circumferential speed of upper blade to that of lower blade is preferably from 0 to 10, preferably from 0.5 to 8, more preferably from 3 to 6.

Referring to the composition of the binder (including hardener) to be incorporated in the back layer, the proportion of the hardener may be preferably selected. In some detail, the optimum proportion of the hardener is from 2 to 30% by weight, preferably from 5 to 20% by weight, more preferably from 8 to 15% by weight, based on the total weight of the back layer.

In order to obtain the back layer according to the present invention, it is important to control the composition of the binder resin, the composition of additives and the amount of these compounds to be added as mentioned above and control the conditions of calendering as the surface smoothening process of the back layer. This will be further described later.

The components constituting the magnetic recording medium of the present invention will be further described hereinafter.

The layer configuration of the tape magnetic recording medium of the present invention is not specifically limited so far as it comprises a magnetic layer formed on one side of a nonmagnetic support and a back layer formed on the other side. For example, a nonmagnetic layer may be provided between the magnetic layer and the nonmagnetic support. An undercoating layer may be provided between magnetic layers or nonmagnetic layer and the nonmagnetic support, or between the back layer and the nonmagnetic support. Alternatively, the magnetic layer or back layer may have a multi-layer structure.

In the present invention, the thickness of the magnetic layer is not specifically limited. It is normally from 0.05 to 5.0 $\mu$m, preferably from 0.1 to 3.5 $\mu$m. The thickness of the back layer is normally from 0.3 to 1.0 $\mu$m, preferably from 0.4 to 0.7 $\mu$m.

The magnetic layer of the present invention comprises a ferromagnetic powder, a binder for dispersing tile ferromagnetic powder therein, and optionally various additives. Examples of the additives include carbon black, abrasive, dispersant, dispersing aid, lubricant, mildewproofing agent, antistatic agent, and oxidation inhibitor. In other words, the back layer and the magnetic layer can have the same composition with respect to the binder and other additives. However, it is important that the kind and amount of components be properly selected from the magnetic layer to the back layer. If various nonmagnetic powders such as carbon black and alumina are incorporated in the magnetic layer and back layer, their particle size and form can be important factors and thus may be properly selected.

Firstly, the nonmagnetic support of the magnetic recording medium of the present invention will be described hereinafter.

The nonmagnetic support to be used in the present invention is not specifically limited. The thickness of the nonmagnetic support is preferably from about 5 to 10 μm, particularly from 6 to 9 μm. The Young's modulus in the longer direction of the nonmagnetic support is from 400 to 1,200 Kg/mm², preferably from 450 to 1,000 Kg/mm².

Examples of the material of the nonmagnetic support used in the present invention include polyester such as polyethylene terephthalate, polyethylene naphthalate; polyolefin such as polypropylene, cellulose derivative such as cellulose triacetate and cellulose diacetate; vinyl resin such as polyvinyl chloride; and plastics such as polycarbonate, polyimide, polyamide and polysulfone. Preferred among these materials are polyethylene terephthalate, polyethylene naphthalate (PEN), polyamide, and polyimide. Particularly preferred among these materials is polyethylene naphthalate (PEN). The support may be subjected to corona discharge treatment, plasma treatment, undercoating treatment, heat treatment, dust-proofing treatment, metal-depositing treatment or alkali treatment before being coated. Such a support is described in West German Patent 3338854A, JP-A-59-116926 (the term "JP-A-" as used herein means an "unexamined published Japanese patent application"), U.S. Pat. No. 4,388,368, and Yukio Mitsuishi, "Seni to Kogyo (Fiber and Industry)", vol. 31, pp. 50–55, 1975. The center line average surface roughness of such a support is preferably from 0.001 to 0.5 μm (cutoff value: 0.25 mm).

The polyethylene naphthalate of the present invention contains a ethylene-2,6-naphthalenedicarboxylate homopolymer, a copolymer containing an ethylene-2,6-naphthalene dicarboxylate repeating unit in an amount of not less than 70% by weight, and a polyester composition which doesn't essentially lose PEN characteristics such as mixture of these polymers with other kinds of polymers (PEN component accounts for not less than 70% by weight of the composition). This PEN is a film-forming polymer.

The PEN film to be used in the present invention can be prepared by biaxially orienting an unoriented film. The biaxial orientation, if it is successive, comprises a first step orientation effected at a temperature of not lower than the glass transition temperature of PEN, preferably 3° C. to 10° C. higher than the glass transition temperature of PEN, and a second step orientation effected at a temperature range of from the same temperature as in the first step orientation to a temperature of 10° C. higher than the first step orientation temperature. The draw ratio is not less than 2, preferably not less than 2.5 in at least monoaxial direction, or not less than 6, preferably not less than 8, as calculated in terms of area factor. The heat treatment (heat set) is preferably effected at a temperature of not lower than 170° C., more preferably not lower than 190° C., under tension. The upper limit of the heat treatment temperature depends on the treatment time. However, it goes without saying that the upper limit of the heat treatment temperature is the maximum allowable temperature at which the film can assume a stable form. The heat treatment time is preferably from several seconds to scores of seconds, more preferably from 3 seconds to 30 seconds. Thereafter, the film is preferably successively oriented in the longer direction by a factor of from 1.05 to 2.5 and in the width direction by a factor of from 1.05 to 2.5 at a temperature of from a temperature of 10° C. lower than the glass transition temperature of PEN to a temperature of 40° C. lower than the melting temperature of PEN. and then again subjected to heat treatment at a temperature of from a temperature of 50° C. lower than the glass transition temperature of PEN to a temperature of 10° C. lower than the melting temperature of PEN.

The ferromagnetic powder to be incorporated in the magnetic layer of the present invention is not specifically limited. The use of a ferromagnetic metal powder containing iron, cobalt or nickel exerts a remarkable effect. Preferred examples of such a ferromagnetic metal powder include a ferromagnetic metal fine powder such as α-Fe, Co, Ni, Fe—Co alloy, Fe—Co—Ni alloy, Fe—Co—Ni—P alloy, Fe—Co—Ni—B alloy, Fe—Ni—Zn alloy, Ni—Co alloy, Co—Ni—Fe alloy and Fe—Al alloy.

The form of the ferromagnetic metal fine powder is not specifically limited. It is normally acicular, granular, cubic, ellipsoidal or tabular.

Referring to the particle size, when it is acicular, the long axis length is from 0.05 to 0.5 μm, preferably from 0.05 to 0.3 μm, particularly from 0.1 to 0.25 μm. The ratio of long axis length to short axis length is from 2/1 to 25/1, preferably from 3/1 to 15/1, particularly preferably 4/1 to 12/1. When the ferromagnetic metal fine powder is tabular, its tabular diameter is from 0.02 to 0.20 μm, preferably from 0.03 to 0.10 μm, particularly preferably from 0.04 to 0.07 μm. The ratio of tabular diameter to tabular thickness is from 1/1 to 30/1, preferably 2/1 to 10/1, particularly preferably from 2.5 to 7/1.

The specific surface area ($S_{BET}$) of the particular ferromagnetic metal is from 47 to 80 m²/g, more preferably from 53 to 70 m²/g. The coercive force (Hc) of the ferromagnetic metal fine powder is from 1,250 Oe to 2,500 Oe. The saturated magnetization ($\sigma_s$) of the ferromagnetic metal fine powder is from 100 to 180 emu/g, preferably from 110 to 150 emu/g. The water content of the ferromagnetic metal fine powder is preferably from 0.1 to 2.0% by weight. The pH value of the ferromagnetic metal fine powder is from 3 to 11 (5 g of ferromagnetic powder/100 g of water). Prior to being dispersed, the ferromagnetic metal fine powder may be dipped in a solvent of anticorrosive agent, surface treatment, dispersant, lubricant, antistatic agent, etc. so that these materials can be adsorbed by the ferromagnetic metal fine powder depending on the purpose.

As the ferromagnetic metal fine powder there may be used an alloy having a metal content of not less than 60% by weight, said metal content comprising at least one ferromagnetic metal powder or alloy (e.g., Fe, Fe—Co, Fe—Co—Ni, Co, Ni, Fe—Ni, Co—Ni, Co—Ni—Fe, Fe—Al) in a proportion of not less than 70% by weight and other components (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P) in a proportion of not more than 40% by weight, more preferably not more than 20% by weight. Alternatively, iron nitride, iron carbide, etc. may be used. In order to reinforce the metallic iron, Al, Si and Cr are preferably incorporated in the surface layer, singly or in admixture. Further, the foregoing ferromagnetic metal fine powder may comprise a small amount of a hydroxide, oxide, alkaline metal element (Na, K, etc.) or alkaline earth metal element (Mg, Ca, Sr) incorporated therein. The process for the preparation of the foregoing ferromagnetic metal fine powder is already known. Typical examples of the ferromagnetic metal fine powder to be used in the present invention can be prepared by these well-known processes.

Examples of the process for the preparation of the ferromagnetic alloy to be used as a ferromagnetic powder in the present invention will be given below.

(a) A process which comprises reduction of a composite organic acid salt (mainly oxalate) with a reducing gas such as hydrogen;

(b) A process which comprises reduction of iron oxide with a reducing gas such as hydrogen to obtain Fe or Fe—Co particle;

(c) A process which comprises the pyrolysis of a metallic carbonyl compound;

(d) A process which comprises adding a reducing agent such as sodium borohydride, hypophosphite and hydrazine to an aqueous solution of a ferromagnetic metal to reduce the ferromagnetic metal;

(e) A process which comprises electrodepositing a ferromagnetic metal powder on a mercury cathode, and then separating the ferromagnetic metal powder from mercury; and (f) A process which comprises evaporating a metal in an inert gas at a low pressure to obtain a metal fine powder.

As the ferromagnetic powder employable herein there may be used a tabular hexagonal barium ferrite. Referring to the particle size of barium ferrite, the particle diameter of the barium ferrite particle is from about 0.001 to 1 $\mu$m. The thickness of the barium ferrite particle is from $\frac{1}{2}$ to $\frac{1}{20}$ time the particle size. The specific gravity of the barium ferrite particle is from 4 to 6 g/cc. The specific surface area of the barium ferrite particle is from 1 $m^2$/g to 70 $m^2$/g.

Further, $FeO_X$ (X=1.33 to 1.50), Co-containing $FeO_X$, etc. may be used if necessary.

Examples of the nonmagnetic powder to be incorporated in the back layer of the present invention include various powders disclosed in JP-A-59-110038 such as carbon black, graphite, tungsten disulfide, boron nitride, silicon dioxide, calcium carbonate, aluminum oxide, iron oxide, titanium dioxide, magnesium oxide, zinc oxide, calcium oxide, lithophone, talc, and stannic oxide.

The average grain diameter of the nonmagnetic powder is normally from 0.005 to 5.0 $\mu$m, preferably from 0.010 to 2.0 $\mu$m.

Examples of the resin component of the binder to be used herein include well-known conventional thermoplastic resin, thermosetting resin, reactive resin, electron radiation-curing resin, ultraviolet-curing resin, visible light-curing resin, and mixture thereof.

As the thermoplastic resin employable herein there may be used one having a number-average molecular weight of from 10,000 to 300,000 and a polymerization degree of from about 50 to 2,000, preferably from about 200 to 600. Examples of such a thermoplastic resin employable herein include vinyl chloride-vinyl acetate copolymer, vinyl chloride polymer, vinyl chloride-vinyl acetate-vinyl alcohol copolymer, vinyl chloride-vinylidene chloride copolymer, vinyl chloride-acrylonitrile copolymer, acrylic acid ester-acrylonitrile copolymer, acrylic acid ester-vinylidene chloride copolymer, acrylic acid ester-styrene copolymer, methacrylic acid ester-acrylonitrile copolymer, methacrylic acid ester-vinylidene chloride copolymer, methacrylic acid ester-styrene copolymer, urethane elastomer, nylon-silicone resin, nitrocellulose-polyamide resin, polyvinyl fluoride, vinylidene chloride-acrylonitrile copolymer, butadiene-acrylonitrile copolymer, polyamide resin, polyvinyl butyral, cellulose derivative (cellulose acetate butyrate, cellulose diacetate, cellulose triacetate, cellulose propionate, nitrocellulose, ethyl cellulose, methyl cellulose, propyl cellulose, methyl cellulose, carboxymethyl cellulose, acetyl cellulose), styrene-butadiene copolymer, polyester resin, polycarbonate resin, chlorovinyl ether-acrylic acid ester copolymer, amino resin, various synthetic rubber thermoplastic resin, and mixture thereof.

As the thermosetting resin or reactive resin there may be used one which exhibits a molecular weight of not more than 200,000 in the form of coating solution but exhibits an infinite molecular weight when it undergoes reaction such as condensation and addition upon heating and moistening after coating and drying. Preferred among these resins is one which doesn't soften or melt until it undergoes pyrolysis. Specific examples of such a resin include phenolic resin, phenoxy resin, epoxy resin, polyurethane resin, polyester resin, polyurethane-polycarbonate resin, urea resin, melamine resin, alkyd resin, silicone resin, acrylic reactive resin (electronic radiation-curing resin), epoxy-polyamide resin, nitrocellulose-melamine resin, mixture of high molecular polyester resin and isocyanate prepolymer, mixture of methacrylate copolymer and diisocyanate prepolymer, mixture of polyester polyol and polyisocyanate, urea formaldehyde resin, mixture of low molecular glycol, high molecular diol and triphenylmethane triisocyanate, polyamine resin, polyimine resin, and mixture thereof.

These thermoplastic resins, thermosetting resins and reactive resins each normally comprise as functional groups one to six kinds of acidic groups such as carboxyl acid (COOM), sulfinic acid, sulfenic acid, sulfonic acid ($SO_3M$), phosphoric acid (PO(OM)(OM)), phosphonic acid, sulfuric acid ($OSO_3M$) and ester group thereof (in which M represents H, alkaline metal, alkaline earth metal or hydrocarbon group); amphoteric groups such as amino acid, aminosulfonic acid, sulfuric or phosphoric acid ester of amino alcohol and alkylbetaine; amino group, imino group, imide group, amide group, hydroxyl group, alkoxyl group, thiol group, alkylthio group, halogen group (F, Cl, Br, I), silyl group, siloxane group, epoxy group, isocyanate group, cyano group, nitrile group, oxo group, acryl group, and phosphinic group. The various functional groups are each contained in an amount of $1\times10^{-6}$ equivalent to $1\times10^{-2}$ equivalent per g of the resin.

The binder hardener is not specifically limited. In general, a polyisocyanate compound is used.

As the polyisocyanate compound there may be used an isocyanate such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate and isophorone diisocyanate; reaction product of the isocyanate with a polyalcohol; dimer to decamer of polyisocyanate produced by the condensation of isocyanates or isocyanate-terminated reaction product of triisocyanate with polyurethane. The average molecular weight of such the polyisocyanate is preferably from 100 to 20,000. Examples of the trade name of commercially available polyisocyanate compounds include Coronate L, Coronate HL, Coronate 2030, Coronate 2031, Millionate MR and Millionate MTL (available from Nippon Polyurethane Co., Ltd.), Takenate D-102, Takenate D-110N, Takenate D-200, Takenate D-202, Takenate 300S and Takenate 500 (available from Takeda Chemical Industries, Ltd.), and Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL and Desmodur Z4273 (available from Sumitomo Bayer Co., Ltd.). These polyisocyanate compounds may be used singly. Alternatively, these polyisocyanate compounds may be in combination to make the best use of the difference in hardening reactivity.

In the present invention, for the purpose of accelerating the hardening reaction, a compound containing a hydroxyl group (e.g., butanediol, hexanediol, polyurethane having a molecular weight of from 1,000 to 10,000, water) or an amino group (e.g., monomethylamine, dimethylamine, trimethylamine) or a metal oxide catalyst may be used. Such a compound containing a hydroxyl group or amino group is preferably polyfunctional.

Such a polyisocyanate is preferably incorporated in each the back layer and magnetic layer in an amount of from 2 to 70 parts by weight, more preferably from 5 to 50 parts by weight based on 100 parts by weight of the total weight of binder resin and polyisocyanate. This is exemplified in JP-A-60-131622, JP-A-61-74138, etc.

The mixing ratio by weight of the binder to the nonmagnetic powder in the back layer is normally from 8 to 400 parts by weight, preferably from 10 to 80 parts by weight based on 100 parts by weight of the nonmagnetic Crowder. The mixing ratio by weight of the binder to the ferromagnetic powder in the magnetic layer is from 5 to 300 parts by weight (more preferably from 100 to 250 parts by weight) based on 100 parts by weight of the ferromagnetic powder.

As the carbon black used in the present invention there may be used furnace for rubber, thermal for rubber, color black, acetylene black or the like. These carbon blacks are used for antistatic electrification, for screening light, for adjusting frictional coefficient or for improving durability.

Examples of abbreviation of these carbon blacks used in USA include SAF, ISAF, IISAF, T, HAF, SPF, FF, FEF, HMF, GPF, APF, SRF, MPF, ECF, SCF, CF, FT, MT, HCC, HCF, MCF, LFF, and RCF. Carbon blacks belonging to D-1765-82a in ASTM Specification of USA can be used. These carbon blacks to be used in the present invention each have an average particle size of from 5 to 1,000 nm (as determined by electron microscope), a specific surface area of from 1 to 800 $m^2/g$ as determined by nitrogen adsorption method, a pH value of from 4 to 11 (as determined by JIS K-6221-1982) and a dibutyl phthalate (DBP) oil adsorption of from 10 to 800 ml/100 g (as determined by JIS K-6221-1982). Referring to the size of the carbon black to be used herein, a carbon black having a size of from 5 to 100 nm may be used for the purpose of lowering the surface electrical resistance of the magnetic layer and/or back layer. Further, a carbon black having a size of from 50 to 1,000 nm may be used to control the strength of the magnetic layer and/or back layer. A finer carbon black (less than 100 nm) may be used for higher smoothness that reduces spacing loss for the purpose of controlling the surface roughness of the magnetic layer. A coarse carbon black (not less than 100 nm) may be used for the purpose of roughening the magnetic layer and/or back layer to lower the friction coefficient. Thus, the kind and amount of carbon black to be used may be selected depending on the purpose of the magnetic recording medium.

These carbon blacks may be subjected to surface treatment with a dispersant as described later or grafted with a resin. Further, a carbon black may be used which has been treated at a temperature of not lower than 2,000° C. in a furnace during its preparation so that the surface thereof is partially graphited. As a special carbon black there may be used a hollow carbon black.

The foregoing carbon black is normally incorporated in the back layer in an amount of from 20 to 400 parts by weight, preferably from 50 to 150 parts by weight based on 100 parts by weight of the binder used. The foregoing carbon black is preferably incorporated in the magnetic layer in an amount of from 0.1 to 30 parts by weight per 100 parts by weight of the ferromagnetic powder. For the carbon black employable herein, reference can be made to "Handbook of Carbon Black", Association of Carbon Black, 1971. These carbon blacks are exemplified in U.S. Pat. Nos. 4,539,257 and 4,614,685, and JP-A-61-92424 and JP-A-61-99927.

In the present invention, the abrasive is used to enhance the durability of the magnetic recording medium or the effect of cleaning VTR head. As the abrasive there may be normally used a material having an abrasive action or scratch polish action. In some detail, one to four of materials having a Mohs hardness of not less than 6, preferably not less than 8, such as α-alumina, γ-alumina, α,γ-alumina, molten alumina, silicon carbide, chromium oxide, cerium oxide, corundum, artificial diamond, α-iron oxide, garnet, emery (main component: corundum and magnetite), silica, silicon nitride, boron nitride, molybdenum carbide, boron carbide, tungsten carbide, titanium carbide, quartz, tripoli, diatomaceous earth and dolomite, may be used in combination. The foregoing abrasive employable herein has an average particle diameter of from 0.005 to 5 μm, particularly preferably from 0.01 to 2 μm. The abrasive is preferably incorporated in the back layer in an amount of from 0.01 to 5 parts by weight, more preferably from 0.1 to 3.0 parts by weight based on 100 parts by weight of the binder used. The abrasive is preferably incorporated in the magnetic layer in an amount of from 0.01 to 20 parts by weight (more preferably from 0.05 tp 18 parts by weight) based on 100 parts by weight of the ferromagnetic powder used. Specific examines of the abrasive employable herein include AKP1, AKP15, AKP20, AKP30, AKP50, AKP80, Hit50 and Hit100, available from Sumitomo Chemical Co., Ltd. These abrasives are further described in JP-B-52-28642.

Examples of the powdered lubricant employable herein include finely divided powder of inorganic material such as graphite, molybdenum disulfide, boron nitride, graphite fluoride, calcium carbonate, barium sulfate, silicon oxide, titanium oxide, zinc oxide, tin oxide and tungsten disulfide; and finely divided powder of resin such as acrylstyrene resin, benzoguanamine resin, melamine resin, polyolefin resin, polyester resin, polyamide resin, polyimide resin and polyethylene fluoride.

Examples of the organic compound lubricant include compound comprising fluorine or silicon incorporated therein such as silicone oil (e.g., dialkyl polysiloxane, dialkoxy polysiloxane, phenyl polysiloxane, fluoroalkyl polysiloxane (e.g., KF96, KF69, available from Shin-Etsu Chemical Co., Ltd.)), aliphatic acid-modified silicone oil, fluorine alcohol, polyolefin (e.g., polyethylene wax, polypropylene), polyglycol (e.g., ethylene glycol, polyethylene oxide wax), tetrafluoroethylene oxide wax, polytetrafluoroglycol, perfluoroalkylether, perfluoroaliphatic acid, perfluoroaliphatic acid ester, perfluoroalkylsulfuric acid ester, perfluoroalkylsulfonic acid ester, perfluoroalkylbenzenesulfonic acid ester and perfluoroalkylphosphoric acid ester; organic acid and organic acid ester compound such as alkylsulfuric acid ester, alkylsulfonic acid ester, alkylphosphonic acid triester, alkylphosphonic acid monoester, alkylphosphonic acid diester, alkylphosphoric acid ester and succinic acid ester; heterocyclic compound containing nitrogen or sulfur such as triazaindolizine, tetraazaindene, benzotriazole, benzodiazole and EDTA; aliphatic acid ester comprising a monobasic aliphatic acid having 10 to 40 carbon atoms and one or more of monovalent, divalent, trivalent, tetravalent and hexavalent alcohols having 2 to 40 carbon atoms; aliphatic acid ester comprising a monobasic aliphatic acid having 10 or more carbon atoms and a monovalent to hexavalent alcohol having 11 to 70 carbon atoms together with that of the aliphatic acid; aliphatic acid or aliphatic acid amide having 8 to 40 carbon atoms, aliphatic acid alkylamide, and aliphatic acid alcohol.

Specific examples of these compounds include butyl caprylate, octyl caprylate, ethyl laurate, butyl laurate, octyl laurate, ethyl myristate, butyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2-hexyldecyl stearate, isotridecyl stearate, amide stearate, alkylamide stearate, butoxyethyl stearate, anhydrosorbitan monostearate, anhydrosorbitan distearate, anhydrosorbitan tristearate, anhydrosorbitan tetrastearate, oleyl oleate, oleyl alcohol, lauryl alcohol, montan wax, and carnauba wax. These compounds may be used singly or in combination.

As the lubricant to be used in the present invention there may be used so-called lubricant additives, singly or in combination. Examples of the lubricant additive include oxidation inhibitor known as corrosion inhibitor (metal chelating agent such as alkylphenol, benzotriazine, tetraazaindene, sulfamide, guanidine, nucleic acid, pyridine, amine, hydroquinone and EDTA), anticorrosive agent. (e.g., naphthenic acid, alkenylsuccinic acid, phosphoric acid, dilauryl phosphate), oiliness improver (e.g., colza oil, lauryl alcohol), extreme-pressure agent (e.g., dibenzyl sulfide, tricresyl phosphate, tributyl phosphite), detergent-dispersant, viscosity index improver, pour point depressant, and antifoaming agent. The foregoing lubricant may be incorporated in the back layer and magnetic layer in a total amount of from 0.01 to 30 parts by weight, particularly preferably in an amount of from 0.05 to 5 parts by weight in the back layer, based on 100 parts by weight of the binder used.

As the dispersant or dispersing aid to be used in the present invention there may be used an aliphatic acid having 2 to 40 carbon atoms ($R_1COOH$ in which $R_1$ represents an alkyl group, phenyl group or aralkyl group having 1 to 39 carbon atoms) such as capryl acid, capric acid, lauric acid, myristic acid, palmitic acid, stearic acid, oleic acid, elaidic acid, linolic acid, linolenic acid, stearolic acid, behenic acid, maleic acid and phthalic acid; alkaline metal (Li, Na, K, etc.) or alkaline earth metal (Mg, Ca, Ba, etc.) salt of the foregoing aliphatic acid; metallic soap comprising $NH_4^+$, Cu, Pb, etc. (copper oleate); aliphatic acid amide; lecithin (soybean oil lecithin) or the like. Other examples of the dispersant or dispersing aid employable herein include higher alcohol having 4 to 40 carbon atoms (butanol, octyl alcohol, myristyl alcohol, stearyl alcohol), sulfuric acid ester thereof, sulfonic acid, phenylsulfonic acid, alkylsulfonic acid, sulfonic acid ester, phosphoric acid monoester, phosphoric acid diester, phosphoric acid triester, alkylphosphonic acid, phenylphosphonic acid, and amine compound. Further examples of the dispersant or dispersing aid include polyethylene glycol, polyethylene oxide, sulfosuccinic acid, sulfosuccinic acid metal salt, and sulfosuccinic acid ester. One or more of these dispersants may be normally used in combination. These dispersants are each incorporated in the back layer and magnetic layer in an amount of from 0.005 to 20 parts by weight, particularly in an amount of from 0.01 to 2 parts by weight in the back layer, based on 100 parts by weight of the binder used. The dispersant may be previously coated to the ferromagnetic powder or nonmagnetic powder or may be added during dispersion. This is further described in JP-B-39-28369 (the term "JP-B-" as used herein means an "examined Japanese patent publication"), JP-B-44-17945, JP-B-48-15001, and U.S. Pat. Nos. 3,387,993 and 3,470,021.

Examples of the mildewproofing agent employable herein include 2-(4-thiazolyl)-benzimidazole, N-(fluorodichloromethylthio)-phthalimide, 10,10'-oxybisphenoxysalicine, 2,4,5,6-tetrachloroisophthalonitrile, p-tolyldiodemethylsulfone, triiodoallyl alcohol, dihydroacetoic acid, mercury phenyloleate, bis(tributyltin) oxide, and salicylanilide.

These mildewproofing agents are further described in "Biseibutsu Saigai to Boshigijustu (Disaster by Microorganism and Preventive Technique)", Kogaku Tosho, 1972, and "Kagaku to Kogyo (Chemistry and Industry)", 32,904, 1979.

Examples of the antistatic agent other than carbon black employable herein include powder of electrically conductive material such as graphite, modified graphite, carbon black graft polymer, tin oxide-antimony oxide, tin oxide and titanium oxide-tin oxide-antimony oxide; natural surface active agent such as saponin; nonionic surface active agent such as alkylene oxide, glycerin, glycidol, polyvalent alcohol, polyvalent alcohol ester and EO adduct of alkylphenol; cationic surface active agent such as higher alkylamine, cyclic amine, hydantoin derivative, amide amine, ester amide, quaternary ammonium salt, pyridine, other heterocyclic compounds, phosphonium and sulfonium; anionic surface active agent containing an acidic group such as carboxylic acid, sulfonic acid, phosphonic acid, phosphoric acid, sulfuric acid ester, phosphonic acid ester and phosphoric acid ester; amino acid; and amphoteric surface active agent such as aminosulfonic acid, sulfuric or phosphoric acid ester of amino alcohol and alkylbetain. These surface active agents may be used singly or in admixture. The foregoing antistatic agent is incorporated in the back layer in an amount of from 0.01 to 30 parts by weight, preferably from 0.1 to 5 parts by weight based on 100 parts by weight of the binder used. The foregoing antistatic agent is incorporated in the magnetic layer in an amount of from 0.01 to 10 parts by weight based on 100 parts by weight of the ferromagnetic powder used. These compounds are used as antistatic agents but may be used for other purposes. For example, these compounds may be used to improve dispersibility, magnetic properties and lubricity or as coating aid, lubricant, hardening accelerator or dispersion accelerator.

The formation of the back layer can be accomplished by an ordinary method. For example, a method may be used which comprises knead-dispersing the foregoing nonmagnetic powder and resin components, and optionally back layer-forming components such as abrasive and hardening agent with a solvent to prepare a back layer coating, and then applying the back layer coating solution to a nonmagnetic support.

In order to prepare the magnetic coating, the foregoing procedure for the preparation of the back layer coating solution can be essentially followed except that the nonmagnetic powder is replaced by a ferromagnetic, powder.

As organic solvents for use in the dispersion, kneading and application of the back layer coating solution or magnetic coating solution there may be used in any proportion a ketone such as acetone, methyl ethyl ketone, methyl isobutyl ketone, cyclohexanone, isophorone and tetrahydrofuran; an alcohol such as methanol, ethanol, propanol, butanol, isobutyl alcohol, isopropyl alcohol and methyl cyclohexanol; an ester such as methyl acetate, ethyl acetate, butyl acetate, isobutyl acetate, isopropyl acetate, ethyl lactate and glycol monoethyl ether acetate; an ether such as diethylether, tetrahydrofuran, glycoldimethylether, glycolmonoethylether and dioxane; a tar-based solvent (aromatic hydrocarbon ) such as benzene, toluene, xylene, cresol, chlorobenzene and styrene; a chlorinated hydrocarbon such as methylene chloride, ethylene chloride, carbon tetrachloride, chloroform, ethylene chlorohydrin and dichlorobenzene; N,N-dimethylformaldehyde, hexane, etc. Two or more of these solvents may be normally used in any proportion. These solvents may contain impurities (polymerization product of solvent itself, water content, raw mate rials, etc.) in an amount as slight as not more than 1% by weight. The foregoing solvent is used in an amount of from 100 to 20,000 parts by weight based on 100 parts by weight of the total solid content in the magnetic layer-forming coating solution, back layer-forming coating solution or undercoating solution. The solid content of the magnetic layer-forming coating solution is preferably from 10 to 40% by weight. The solid content of the back layer-forming coating is preferably from 5 to 20% by weight. An aqueous solvent (e.g., water, alcohol, acetone) may be used instead of the organic solvent.

The dispersion or kneading method is not specifically limited. Further, the order of addition of the various components (resin, powder, lubricant, solvent, etc.), the position at which these components are added during dispersion or kneading, the dispersion temperature (0° C. to 80° C.), etc. may be properly predetermined. For the preparation of the magnetic layer-forming coating solution and back layer-forming coating solution, an ordinary kneader may be used. Examples of such a kneader include twin-roll mill, three roll mill, ball mill, pebble mill, trommel mill, sand grinder, Szegvari, attritor, high speed impeller, disperser, high speed stone mill, high speed impact mill, disper, kneader, high speed mixer, ribbon blender, cokneader, intensive mixer, tumbler, blender, homogenizer, single-screw extruder, twin-screw extruder, and ultrasonic disperser. For dispersion/kneading, a plurality of these dispersers and kneaders are normally provided to effect continuous treatment. For the details of dispersion/kneading, reference can be made to T. C. Patton, "Paint Flow and Pigment Dispersion", John Wiley & Sons, 1964, Shinichi Tanaka, "Kogyo Zairyou (Industrial Material)", vol. 25, No. 37, 1977, and literatures cited in these references. In order to facilitate dispersion/kneading, a steel ball, steel bead, ceramic bead, glass bead or organic polymer bead having a diameter of from 0.05 mm to 10 cm in sphere equivalence may be used as an auxiliary material for dispersion/kneading. The shape of these materials are not limited to sphere. Dispersion and kneading are also described in U.S. Pat. Nos. 2,581,414 and 2,855,156. In the present invention, dispersion/kneading can be effected in accordance with methods described in the foregoing references and literatures cited in the references to prepare a magnetic coating solution and a back layer coating solution.

Referring to the method for the application of the foregoing magnetic coating solution and back layer coating solution to a support, the viscosity of the coating solution is adjusted to a range of from 1 to 20,000 cSt (at, 20° C.). An air doctor coater, blade coater, air knife coater, squeeze coater, dip coater, reverse-roll coater, transfer roll coater, gravure coater, kiss coater, cast coater, spray coater, rod coater, forward roll coater, curtain coater, bar coater, extrusion coater, spin coater, etc. can be used. Other coating methods can be also used. These coating methods are further described in "Coating Industry", Asakura Shoten, pp. 253–277, Mar. 20, 1971.

The order of application of these coating solutions may be arbitrarily selected. The support or undercoating layer may be subjected to corona discharge treatment before the application of the desired coating solution to enhance the adhesivity thereof with the coating solution. If it is desired to form the magnetic layer or back layer with a plurality of layers, simultaneous multi-layer coating method, successive multi-layer coating method, etc. may be used. These methods are further described in JP-A-57-123532, and JP-B-62-37451.

The magnetic coating solution which has thus been applied to the support to a thickness of from about 1 to 200 $\mu$m is immediately subjected to magnetic orientation treatment, i.e., orientation of the ferromagnetic powder in the layer at 500 to 5,000 G in desired directions (vertical, longitudinal, crosswise, random, diagonal, etc.) at a temperature of from 20° C. to 130° C. in many stages. The magnetic layer thus formed is then dried to a thickness of from 0.1 to 30 $\mu$m. In this process, the support is normally carried at a travelling rate of from 10 to 900 m/min. In a plurality of drying zones, the drying temperature is controlled to a range of from 20° C. to 130° C. so that the residual amount of solvent in the coating film is from 0.1 to 40 mg/($\frac{1}{2}$ in.)/m$^2$.

The coating layer (including back layer and magnetic layer) thus dried is then optionally calendered. For this calendering, a supercalender roll may be used. The calendering reduces voids developed by the elimination of the solvent during drying and hence enhances the packing density of the ferromagnetic powder in the magnetic layer, making it possible to obtain a magnetic recording medium having high electromagnetic characteristics.

In the magnetic layer thus calendered, if a hardener is used as a binder-forming component, not less than 90% by weight of the hardener incorporated in the coating layer stays unreacted. Therefore, it is preferred that the magnetic layer be hardened to allow the hardener to undergo reaction in a proportion of at least 50% by weight (particularly not less than 80% by weight) before the subsequent treatment. For the hardening treatment, heat treatment or electron radiation curing may be used. In the present invention, either method may be used. This hardening treatment allows the unreacted hardener contained in the coating layer thus calendered to react with a resin component such as vinyl chloride copolymer and polyurethane resin to form a three-dimensional network crosslinked structure. The heat treatment process is well-known itself. In the present invention, heat treatment may be conducted in accordance with the well-known method. For the heat treatment, the heating temperature is normally predetermined to not lower than 40° C. (preferably from 50° C. to 80° C.), and the heating time is normally predetermined to not less than 20 hours (preferably from 24 hours to 7 days). Further, the electron radiation curing process is well-known itself. In the present invention, hardening can be conducted in accordance with the well-known method.

The linear pressure during calendering is normally from 50 to 800 Kg/cm, preferably from 100 to 600 Kg/cm, more preferably from 200 to 500 Kg/cm.

In the present invention, the magnetic recording medium thus prepared is cut by an ordinary cutter such as slitter into a desired form which is then wound on a plastic or metallic reel.

In the present invention, the surface of the magnetic layer and/or the back layer may be varnished with an abrasive tape immediately before winding or at previous steps. This process is disclosed in JP-A-63-259830.

The magnetic recording medium may be wiped for the purpose of removing stain or extra lubricant from the surface of the magnetic recording medium. In some detail, the surface of the magnetic layer and back layer is wiped with a nonwoven fabric. Examples of such a wiping material employable herein include various Vilenes available from Japan Vilene Co., Ltd., Toraysee and Ecsaine available from Toray Industries, Inc., and Kuraray WRP series available from Kuraray Co., Ltd. Examples of the nonwoven fabric employable herein include nonwoven nylon fabric, nonwoven polyester fabric, nonwoven rayon fabric, nonwoven acrylonitrile fabric, and nonwoven fabric of textile blend. In addition, tissue paper, kimwipe, etc. may be used. These materials are further described in JP-A-1-201824. This wiping makes it possible to completely remove deposits and organic substances from the magnetic layer and/or back layer, lowering the frequency of occurrence of dropouts and clogging.

In the process for the preparation of the magnetic recording medium, the previous treatment and surface treatment of a powder such as ferromagnetic powder and nonmagnetic powder, the kneading/dispersion of the powder, the application (i.e., coating), orientation and drying of the coating solution, the calendering of the coating solution, the hardening treatment (heat treatment, irradiation with radiation (EB)) of the material, the cutting of the material, the varnishing of the material, the wiping of the material, and the winding of the material are continuously conducted. The method described in JP-B-41-13181 is considered to be an essential and important technique in the art. However, the order of these steps is not limited to that mentioned above.

For the preparation of the ferromagnetic powder or nonmagnetic powder, binder, additives (e.g., lubricant, dispersant, antistatic agent, surface treatment, carbon black, abrasive, light screen, oxidation inhibitor, mildewproofing agent), solvent and support or magnetic recording medium, reference can also be made to JP-B-56-26890.

The present invention will be further described in the following examples. Those skilled in the art can easily understand that the components, proportion and order of operation can be changed without departing from the spirit of the invention.

Therefore, the present invention should not be construed as being limited to the following examples. The term "parts" as used hereinafter is by weight.

EXAMPLE 1

The component [I] of the following magnetic coating composition was thoroughly kneaded in a kneader. To the material was then added the component [II]. The mixture was then thoroughly kneaded. Before coating, the component [III] was added to the mixture which was then subjected to dispersion and then dispersed to prepare a magnetic coating solution.

The viscosity of the magnetic coating solution thus obtained was then properly adjusted. The magnetic coating solution was then applied to a polyethylene naphthalate having a thickness of 7 μm (Young's modulus in the longer direction: 650 Kg/mm$^2$; Young's modulus in the width direction: 850 Kg/mm$^2$) as a nonmagnetic support to obtain a dry thickness of 3 μm.

| | Magnetic coating composition | |
|---|---|---|
| [I] | Ferromagnetic metallic powder (metallic Fe powder comprising Co in an amount of 22 atm. % based on Fe and Al in an amount of 10 atm. % based on Fe; long axis length: 0.08 μm; specific surface area ($S_{BET}$): 57 m$^2$/g) | 100 parts |
| | Phosphoric acid ester (phenyl phosphonate) | 2 parts |
| | Vinyl chloride copolymer resin (MR110, available from Nippon Zeon Co., Ltd.) | 9.5 parts |
| | Polyurethane resin (UR8600, available from Toyobo Co., Ltd.) | 5 parts |
| | 2-Ethylhexyl palmitate | 0.6 parts |
| | Cyclohexanone | 60 parts |
| | Methyl ethyl ketone | 80 parts |
| [II] | Dispersion 1 | |
| | Carbon black (#3250B, available from Mitsubishi Kasei Corp.) | 1 part |
| | Polyurethane resin (UR8600, available from Toyobo Co., Ltd.) | 1 part |
| | Methyl ethyl ketone | 10 parts |
| | Dispersion 2 | |
| | Abrasive (HIT55 [α-Al$_2$O$_3$], available from Sumitomo Chemical Co., Ltd.) | 13 parts |
| | Vinyl chloride copolymer resin (MR110, available from Nippon Zeon Co., Ltd.) | 1 part |
| | Cyclohexanone | 60 parts |
| | Methyl ethyl ketone | 40 parts |
| [III] | Polyisocyanate (Coronate 3040, available from Nippon Polyuethane Industry Co., Ltd.) | 4 parts |
| | Amide stearate | 0.5 parts |
| | Palmitic acid | 0.5 parts |
| | Butoxyethyl stearate | 0.5 parts |
| | Methyl ethyl ketone | 50 parts |
| | Toluene | 30 parts |

The nonmagnetic support to which the foregoing magnetic coating solution had been applied was subjected to magnetic orientation while the magnetic coating solution was undried. The magnetic coating was then dried. Subsequently, to the following back layer coating composition [I] was added the component [II] immediately before coating. The coating solution was then applied to the support surface on the side thereof opposite the magnetic layer to obtain a dry thickness of 0.6 μm.

| | Back layer coating composition | |
|---|---|---|
| [I] | Carbon black (BP600, available from Cabot Co., Ltd.) | 97 parts |
| | Carbon black (MTCI, available from Cancarb Co., Ltd.) | 3 parts |
| | α-Al$_2$O$_3$ (HIT55, available from Sumitomo Chemical Co., Ltd.) | 0.1 parts |
| | 2-Ethylhexyl stearate | 0.5 parts |
| | Copper oleate | 0.1 parts |
| | Vinyl chloride copolymer resin (MR110, available from Nippon Zeon Co., Ltd.) | 50 parts |
| | Polyurethane resin (UR8300, available from Toyobo Co., Ltd.) | 40 parts |
| | Cyclohexanone | 200 parts |
| | Methyl ethyl ketone | 300 parts |
| [II] | Polyisocyanate (Coronate 3040, available from Nippon | 20 parts |

-continued

| Back layer coating composition | |
|---|---|
| Polyuethane Co., Ltd.) | |
| Methyl ethyl ketone | 3,500 parts |
| Toluene | 200 parts |
| Silicone compound | 0.1 parts |
| (KF69, available from Shin-Etsu Chemical Co., Ltd.) | |

The coated material was then dried. Subsequently, the coated material was calendered at a temperature of 90° C., a linear pressure of 350 Kg/cm and a rate of 200 m/min five times to prepare a laminate of nonmagnetic support, magnetic layer and back layer.

The laminate was then subjected to heat treatment at a temperature of 60° C. for 24 hours so that the polyisocyanate compound incorporated in the laminate was hardened. The laminate was then slit into ½ in. strips under the following slitting conditions.

Slitting rate: 400 m/min.

Depth of engaging: 0.5 mm

Circumferential speed ratio: 1.05

After slitting, the surface of the magnetic layer was varnished with an abrasive tape (K10000, available from Fuji Photo Film Co., Ltd.), and then wiped with a wiping material (WRP736, available from Kuraray Co., Ltd.) to prepare a ½ in. video tape.

EXAMPLE 2

The procedure of Example 1 was followed Lo prepare a video tape except that as the nonmagnetic support there was used one having a Young's modulus in the longer direction of 500 Kg/mm$^2$ and a Young's modulus in the width direction of 1,100 Kg/mm$^2$ and the slitting rate was changed to 500 m/min.

EXAMPLE 3

The procedure of Example 1 was followed to prepare a video tape except that as the nonmagnetic support there was used one having a Young's modulus in the longer direction of 450 Kg/mm$^2$ and a Young's modulus in the width direction of 1,400 Kg/mm$^2$ and the slitting rate was changed to 600 m/min.

EXAMPLE 4

The procedure of Example 2 was followed to prepare a video tape except that the slitting rate was changed to 600 m/min.

Comparative Example 1

The procedure of Example 1 was followed to prepare a video tape except that as the nonmagnetic support there was used one having a Young's modulus in the longer direction of 750 Kg/mm$^2$ and a Young's modulus of 700 Kg/mm$^2$ in the width direction.

The various samples thus obtained were then evaluated in accordance with the following methods. The results are set forth in Table 1.

Evaluating method

Protrusion amount on the back layer:

The tape sample was cut crosswise by a razor knife. The section of the tape was then observed and measured with an electron microscope (magnification: 5,000 power). Young's modulus of nonmagnetic support (base) and back layer:

For the measurement of Young's modulus, a tensile testing machine was used. Young's modulus set forth in Table 1 indicates value determined in the width direction. The Young's modulus of the back layer was obtained by measuring the Young's modulus of the entire magnetic tape, measuring the Young's modulus of the magnetic tape from which the back layer had been stripped off, and then determining the difference in Young's modulus between them. When the thickness of the back layer is 2 $\mu$m, a value having a higher precision can be obtained.

Scratching of back layer:

For the measurement of the initial value of scratching of the back layer, the tape sample was subjected to recording and reproduction in D5-VTR. The guide was then visually examined for stain. For the measurement of the scratching of the back layer after repeated use, the tape sample was subjected to recording and 100-pass reproduction.

The guide was then visually examined for stain.

O: No powder deposit observed in the vicinity of guide flange in VTR

Δ: Some powder deposit observed in the vicinity of guide flange in VTR x: A large a mount of powder deposit observed in the vicinity of guide flange in VTR Edge break:

For the measurement of the initial value of edge break, the tape sample was subjected to recording and reproduction in D5-VTR. The tape sample was thee visually examined for the presence of tape edge break. For the measurement of edge break after repeated use, the tape sample was subjected to recording and 100-pass reproduction. The tape sample was then visually examined for the presence of tape edge break.

O: Little or no trace of rubbing observed on the tape edge under a scanning electron microscope at 2,000 power Δ: Observed rubbed but unbroken at the edge of the back layer x: Observed rubbed and broken at the edge of the back layer Ra of back layer:

The center line average roughness (Ra) was determined by a light interference method using a digital optical profile meter (available from WYKO) at a cutoff of 0.25 mm.

Output:

A 33.4 MHz signal was recorded on the tape sample using D5-VTR (available from Matsushita Electric Industrial Co., Ltd.). The signal was then reproduced from the tape sample. The reproduced output was determined relative to that from a reference tape (Example 1) as 0 dB.

O: Reproduced output of not lower than 0 db

Δ: Reproduced output of from not less than −0.5 dB to less than 0 dB x: Reproduced output of less than −0.5 dB Dropout:

The number of points at which the output by D5-VTR shows a drop over 0.2 $\mu$sec or longer was determined by means of a dropout counter.

TABLE 1

| Example No. | Protrusion amount on back layer (μm) | Young's modulus of base (Kg/mm²) | Ra of back layer (nm) | Young's modulus of back layer (Kg/mm²) | Scratching of back layer (initial/ repeated) | Output (33.4 MHz) | Edge break (initial/ repeated) | Dropout |
|---|---|---|---|---|---|---|---|---|
| Example 1 | −0.3 | 850 | 5.5 | 650 | o/o | o | o/o | 150 |
| Example 2 | −0.1 | 1,100 | 7.5 | 680 | o/Δ | o | o/o | 300 |
| Example 3 | −0.1 | 1,400 | 5.2 | 640 | o/Δ | o | o/o | 230 |
| Example 4 | −0.2 | 1,100 | 4.9 | 700 | o/o | o | o/o | 130 |
| Comparative Example 1 | +0.2 | 700 | 5.3 | 620 | x/x | o | o/o | 3,500 |

As is apperent from the result in Table 1, the magnetic recording medium of the present invention has no protrusion on the edge face of the back layer, i.e., minus protrusion or zero protrusion. It can also be seen that the examples of the present invention, in which the back layer exhibits a Young's modulus of not less than 600 Kg/mm², have no scratching of back layer and edge break and a high output. On the other hand, Comparative Example 1, in which the protrusion on the edge face of the back layer is plus, leaves something to be desired in the prevention of scratching of back layer.

The present invention can provide a magnetic recording medium which has no scratching of back layer, exhibits an excellent running durability and produces a high output by predetermining the shape of the edge face of the back layer and the Young's modulus in the width direction of the back layer.

While the invention has been described in detail and with reference to specific embodiments thereof, it will be apparent to one skilled in the art that various changes and modifications can be made therein without departing from the spirit and scope thereof.

What is claimed is:

1. A tape-shaped magnetic recording medium having at least one edge face obtained by longitudinally slitting a nonmagnetic support having on one side thereof a magnetic layer comprising a ferromagnetic powder dispersed in a binder and on the other side a back layer, wherein the edge face defines a plurality of widths with a first width being greater than all other widths and wherein the edge face of said back layer doesn't protrude from a longitudinal line tangent to the first width and wherein the Young's modulus of said back layer in the width direction is not less than 640 Kg/mm² and the Young's modulus in the width direction of said nonmagnetic support is not less than 850 Kg/mm².

2. The tape-shaped magnetic recording medium as in claim 1, wherein said back layer has Ra of from not less than 3.0 nm to less than 8.0 nm.

3. The tape-shaped magnetic recording medium as in claim 1, wherein said back layer contains a hardener in a proportion of from 2 to 30% by weight based on the total weight of the back layer.

4. The tape-shaped magnetic recording medium as in claim 1, wherein said magnetic layer has a thickness of from 0.05 to 5.0 μm, said back layer has a thickness of from 0.3 to 1.0 μm, and said nonmagnetic support has a thickness of from 5 to 10 μm.

5. The tape-shaped magnetic recording medium as in claim 1, wherein said nonmagnetic support is selected from the group consisting of polyethylene naphthalate, polyamide and polyimide.

6. The tape-shaped magnetic recording medium as in claim 1, wherein said ferromagnetic powder is a ferromagnetic metal powder containing at least one metal selected from the group consisting of iron, cobalt or nickel.

7. The tape-shaped magnetic recording medium as in claim 1, wherein said ferromagnetic powder is a ferromagnetic metal powder having a long axis length of from 0.05 to 0.3 μm.

8. The tape-shaped magnetic recording medium as in claim 1, wherein said ferromagnetic powder has a specific surface area of from 47 to 80 m²/g.

9. The tape-shaped magnetic recording medium as in claim 1, wherein said back layer contains at least one nonmagnetic powder selected from the group consisting of carbon black, graphite, tungsten disulfide, boron nitride, silicon dioxide, calcium carbonate, aluminium oxide, iron oxide, titanium dioxide, magnesium oxide, zinc oxide, calcium oxide, lithophone, talc and stannic oxide.

10. The tape-shaped magnetic recording medium as in claim 1, wherein said back layer contains a binder and magnetic powder in a mixing ratio by weight of binder/ nonmagnetic powder of from 8 to 400 parts by weight based on 100 parts by weight of the nonmagnetic powder.

11. The tape-shaped magnetic recording medium as in claim 1, wherein said back layer contains a carbon black in mount of from 20 to 400 parts by weight based on 100 parts by weight of the binder.

* * * * *

UNITED STATES PATENT AND TRADEMARK OFFICE
CERTIFICATE OF CORRECTION

PATENT NO. : 5,827,599
DATED : October 27, 1998
INVENTOR(S) : Naoto Murao et al.

It is certified that error appears in the above-identified patent and that said Letters Patent is hereby corrected as shown below:

In claim 10, line 3, please change "magnetic" to --a non-magnetic--.

In claim 11, line 3, please change "mount" to --an amount--.

Signed and Sealed this

First Day of May, 2001

Attest:

NICHOLAS P. GODICI

*Attesting Officer*   *Acting Director of the United States Patent and Trademark Office*